Sept. 2, 1924.
W. MEIDENBAUER
LUG
Filed Aug. 12, 1922
1,507,499
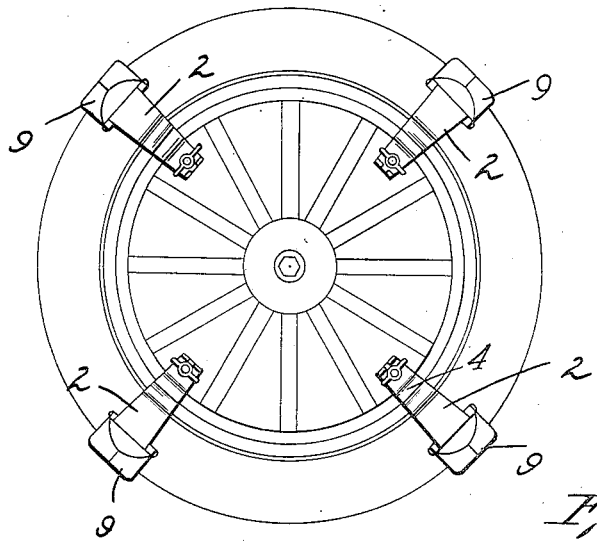
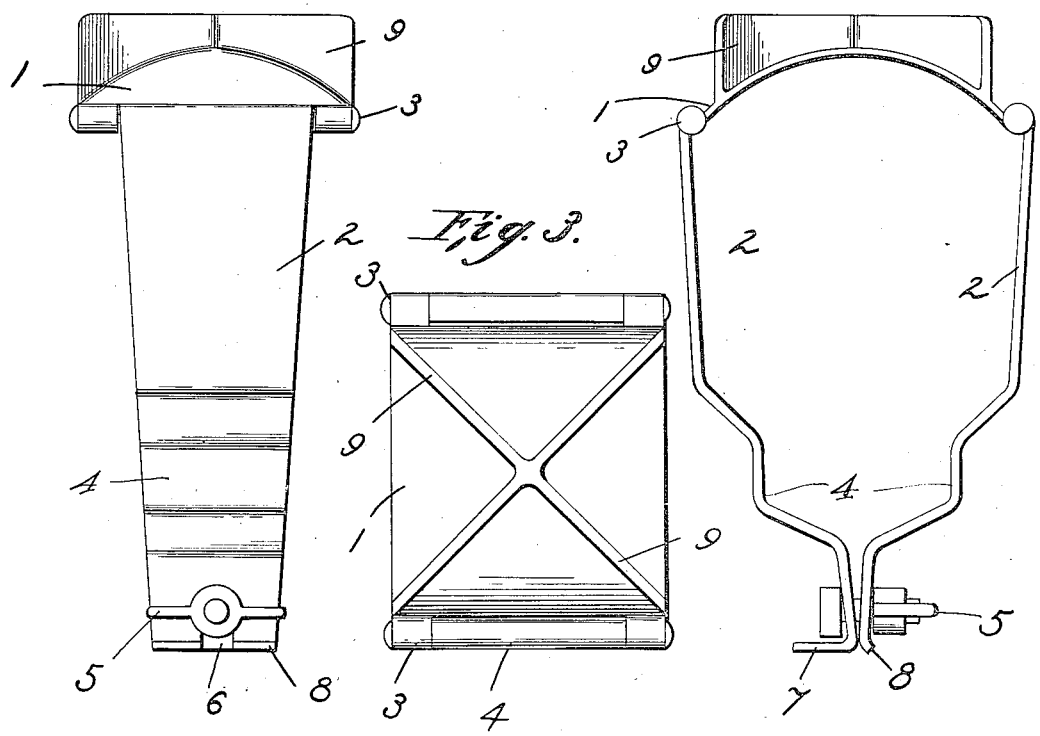
William Meidenbauer
INVENTOR
BY Victor J. Evans
ATTORNEY
WITNESS:

Patented Sept. 2, 1924.

1,507,499

UNITED STATES PATENT OFFICE.

WILLIAM MEIDENBAUER, OF WAUKESHA, WISCONSIN.

LUG.

Application filed August 12, 1922. Serial No. 581,447.

*To all whom it may concern:*

Be it known that I, WILLIAM MEIDENBAUER, a citizen of the United States, residing at Waukesha, in the county of Waukesha and State of Wisconsin, have invented new and useful Improvements in Lugs, of which the following is a specification.

This invention relates to a mud lug for motor vehicles, the general object of the invention being to provide a lug which may be easily and quickly applied to a wheel so as to permit the vehicle to move out of a mud hole or other bad place in the road.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a view of a wheel showing my invention in use.

Figure 2 is an edge elevation of my invention.

Figure 3 is a top plan view thereof.

Figure 4 is a side elevation.

As shown in these views the device comprises a curved plate 1 of substantially rectangular formation for engaging the tread of a tire and the side plates 2 which are hinged to the side edges of the plate 1, as at 3. The side plates are designed to extend beyond the inner edge of the rim of the wheel where they are bent inwardly, as at 4, to engage the sides and inner face of the rim with the extremities of the plates contacting so that they can be bolted together by the bolt and wing nut 5. I prefer to form a slot 6 in the extremity of one plate and to provide a flange 7 on the extremity of the other plate, said flange holding the bolt against turning and the slot permitting the parts to be separated without entirely removing the nut. The slotted extremity can also be flanged, as at 8, to prevent the plate from slipping from under the nut. A pair of cross ribs 9 are formed on the outer face of the plate 1 and terminate at each corner thereof for providing gripping parts and preventing the device from slipping upon the road surface. I prefer to use four of these devices on each of the rear wheels. The devices not only serve to prevent the wheels from spinning in mud holes and the like but they can also be used on icy or wet streets.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A lug of the character described comprising a curved plate for engaging the tread of the tire, a pair of side plates hingedly secured to the sides of the curved plate and being bent inwardly adjacent the free ends to provide felly engaging parts, said side plates being further bent in parallel adjacent parts operatively associated, one of which is provided with a slot aligned with an opening in the other part, a flange formed on one of said parts and arranged at right angles thereto, an inclined flange formed on the opposite part and said inclined flange being provided with a slot communicating with the first mentioned slot, a bolt received in the slot and opening respectively and a wing nut for said bolt.

In testimony whereof I affix my signature.

WILLIAM MEIDENBAUER.